US008275636B2

(12) United States Patent
Berg et al.

(10) Patent No.: US 8,275,636 B2
(45) Date of Patent: Sep. 25, 2012

(54) IDENTITY INSURANCE TRANSACTION METHOD

(75) Inventors: Ray Berg, New York, NY (US); M. Greg Shanton, Centeville, VA (US)

(73) Assignee: American International Group, Inc., New York, NY (US)

( * ) Notice: Subject to any disclaimer, the term of this patent is extended or adjusted under 35 U.S.C. 154(b) by 1851 days.

(21) Appl. No.: 10/040,911

(22) Filed: Oct. 26, 2001

(65) Prior Publication Data

US 2002/0188481 A1 Dec. 12, 2002

Related U.S. Application Data

(60) Provisional application No. 60/243,601, filed on Oct. 26, 2000.

(51) Int. Cl.
G06Q 40/00 (2006.01)
G06Q 20/00 (2006.01)
(52) U.S. Cl. .................. 705/4; 705/38; 705/75
(58) Field of Classification Search .......... None
See application file for complete search history.

(56) References Cited

U.S. PATENT DOCUMENTS

| | | | |
|---|---|---|---|
| 4,831,526 A | | 5/1989 | Luchs et al. |
| 5,267,314 A | | 11/1993 | Stambler |
| 5,659,616 A | | 8/1997 | Sudia |
| 5,899,980 A | | 5/1999 | Wilf et al. |
| 6,272,471 B1 | * | 8/2001 | Segal ............................ 705/4 |
| 6,315,196 B1 | | 11/2001 | Bachman |
| 6,405,177 B1 | | 6/2002 | DiMattina |
| 6,658,394 B1 | * | 12/2003 | Khaishgi et al. ............... 705/58 |
| 6,839,690 B1 | * | 1/2005 | Foth et al. ..................... 705/53 |
| 6,862,571 B2 | | 3/2005 | Martin et al. |
| 6,922,720 B2 | | 7/2005 | Cianciarulo et al. |
| 7,028,007 B1 | * | 4/2006 | Abrahams et al. .............. 705/38 |

(Continued)

FOREIGN PATENT DOCUMENTS

WO        WO 9740460 A1 * 10/1997

(Continued)

OTHER PUBLICATIONS

Anonymous, "Travelers Property Casualty Provides Consumers with First Insurance Protection Against Identity Fraud Expenses." Sep. 28, 1999; BusinessWire (2 pages).*

(Continued)

Primary Examiner — Luke Gilligan
Assistant Examiner — Rachel L Porter
(74) Attorney, Agent, or Firm — Leydig, Voit & Mayer, Ltd.

(57) ABSTRACT

The instant invention relates to a system and method for ensuring and verifying the identity of all parties involved in an online marketplace transaction involving buyers, sellers, and third parties, such as a marketplace. Anonymous transactions are supported by the present invention. Verification is provided and insurance may be purchased in accordance with the instant invention guaranteeing that the parties are who they represent themselves to be and are capable of entering into the transaction, thereby facilitating completion of the online transaction. Both the verification provided and insurance purchased take into account numerous factors including, but not limited to, the credit score of a user trading counterpart, the amount and type of a user's or trading counterpart's past trading activity, the monetary amount, size, and type of transaction for which verification and/or insurance is sought, and the nature of the goods and/or services involved in the transaction for which verification and/or insurance is sought.

15 Claims, 4 Drawing Sheets

U.S. PATENT DOCUMENTS

| | | | |
|---|---|---|---|
| 2002/0042763 A1* | 4/2002 | Pillay et al. | 705/35 |
| 2002/0116228 A1 | 8/2002 | Bauer et al. | |
| 2004/0181493 A1* | 9/2004 | Cross et al. | 705/75 |
| 2008/0126136 A1* | 5/2008 | Nighan | 705/4 |

FOREIGN PATENT DOCUMENTS

| WO | WO 01/39090 A1 | 5/2001 |
|---|---|---|

OTHER PUBLICATIONS

Van Haste, Clara "Firms Rush to Buy Errors and Omissions Insurance," On Wall Street, Sep. 1, 1998, p. 1 (3 pages).*

Banham, Russ, "Premium rates expected to rise as companies renew coverage"; Nov. 12, 1999, Journal of Commerce (5th Edition). p. 10.*

Green, Paula L., "Stockbroker Liability Mart Survives Crash," Oct. 20, 1988, Journal Of Commerce (Five Star Edition), p. 9A.*

Jeffery A. Siderius, Insurance for Electronic Data Risks: An Idea whose Time Has Come?, Mealey's Technology Litigation and Insurance, Mar. 1999,vol. 1,#1, (4 pages).

Daniel S. Levine, Cargo Insurance, World Trade, Aug. 1997, vol. 10, Issue 8, (3 pages).

"Net Exporter," Campbell, A.J., Business America, Sep. 1998, vol. 119, Issue 9, (3 pages).

"Covering Ocean Cargo," Fletcher, Doyle W., American Agent & Broker, Oct. 1997, vol. 69, Issue 10, (5 pages).

"Delivering the Goods for Truckers," Brown, Marshall, American Agent & Broker, Oct. 1996, vol. 68, Issue 10, (5 pages).

International Search Report dated Sep. 12, 2002 for International Application No. PCT/US01/50730 (4 Pages).

Patent Application Publication No. US 2002/0002475 A1 of Freedman et al (Jan. 3, 2002).

Patent Application Publication No. US 2002/0091551 A1 of Parisi (Jul. 11, 2002).

Patent Application Publication No. US 2002/0091550 A1 of White et al (Jul. 11, 2002).

Patent Application Publication No. US 2002/0023051 A1 of Kunzle et al. (Feb. 21, 2002).

Patent Application Publication No. US 2002/0055862 A 1 of Jinks (May 9, 2002).

Patent Application Publication No. US2002/0046053 A1 of Hare et al. (Apr. 18, 2002).

* cited by examiner

IDENTITY INSURANCE TRANSACTION METHOD

RELATED APPLICATION

This application is based upon provisional application Ser. No. 60/243,601, entitled "IDENTITY INSURANCE TRANSACTION METHOD," filed on Oct. 26, 2000. The contents of this provisional application are fully incorporated herein by reference.

FIELD OF THE INVENTION

The present invention pertains to a system and method for providing information regarding the identity and financial data of a user or trading counterpart and, in particular, to an interactive and dynamic system and method that can verify the identity and financial viability of a user or trading counterpart in an online, trading marketplace. The instant invention also relates to a system and method for generating and providing a financial product, which can provide insurance coverage guaranteeing the identity or financial viability of a user or trading counterpart and/or the completion of a transaction with a trading counterpart. The financial product can be tailored according to factors, such as, the size, nature and type of transaction involved, the creditworthiness, credit score or financial viability of a trading counterpart, and/or the amount and type of a trading counterpart's previous trading activity.

BACKGROUND OF THE INVENTION

Business transactions, especially large transactions or transactions between parties new to one another, typically involved face-to-face interaction in order to initiate familiarity and open and honest communication. The advent of the Internet, however, has allowed parties to conduct business transactions without the assurances that accompany personal interaction. Thus, although businesses have greatly benefited from the lower costs and access to larger markets associated with electronic commerce ("e-Commerce") transactions over the Internet and World Wide Web, certain risks and obstacles are associated with such e-Commerce transactions. For example, uncertainty over the identity of a trading counterpart can create an obstacle to successfully completing a transaction, particularly large transactions involving a sizeable commitment of resources. In addition, the inability to accurately verify the financial viability of a trading counterpart can lead to wasted resources and lost profits due to a counterpart's financial inability to complete a transaction. The inability to verify a trading counterpart's identity or financial ability to enter into and complete a transaction can also make it easier for a party to misrepresent itself, and even commit fraud.

Patents that disclose methods for conducting an online business transaction are known. For example, U.S. Pat. Nos. 5,267,314 and 5,659,616, both of which are incorporated herein by reference, disclose such methods. U.S. Pat. No. 5,267,314 discloses a method and system for authenticating parties using encryption technology. U.S. Pat. No. 5,659,616 discloses a method for authenticating parties using digital signatures. These methods, however, do not disclose the use of a joint venture or business information provider or the verification of a trading counterpart's identity and financial ability to enter into an online marketplace transaction. Furthermore, the benefit of previously disclosed methods is limited due to uncertainty surrounding the identity and financial viability of trading counterparts. As such, the instant invention provides identity insurance products guaranteeing a trading counterpart's identity and financial ability to enter into an online marketplace transaction.

The risks and obstacles associated with conducting e-Commerce transactions are particularly keen for business-to-business trading marketplaces or brokering websites available on the Internet or World Wide Web. Such marketplaces and websites often involve a large number of parties, thus intensifying the risks associated with not being able to verify the identity of a party or its financial ability to complete a transaction. Indeed, these risks often prevent parties from participating in such marketplaces or from making large online purchases or sales, thus resulting in lost revenue and profits.

These deficiencies are overcome by the novel methods and system for providing information about the identity and financial viability of trading counterparts and users in an online, trading marketplace. Users of the instant invention can be any party to a business transaction, such as, buyers, sellers and third parties, such as, online marketplaces. In accordance with the present invention, a seller can register with an online marketplace by submitting information about itself to a Joint Venture Authority ("JV Authority"). The JV Authority can be a business information provider, such as, a provider of business, financial and/or quality assurance information, and/or a joint venture between an insurance underwriter and a business information provider. The business information provider can be, for example, Dun & Bradstreet, and preferably furnishes identity and financial information regarding a trading counterpart or user, such as, contact information, financial risk assessment, financial viability, creditworthiness, credit score, and profitability. The insurance underwriter can supply information regarding a trading counterpart's or user's insurance coverage. The business information provider can also be a provider of quality assurance information, such as, without limitation, Bureau Veritas, Intertek Testing Services, and/or SGSon SITE.

The JV Authority can process information submitted by a user in conjunction with information provided by a business information provider in order to verify the identity and/or financial viability of a trading counterpart or user. Once the identity of a user is verified, the JV Authority sends information regarding the verified user to a Registration Authority that can register the verified user and request security credentials or a unique identifier, such as, a digital certificate, from a Credential Issuing Authority. Security credentials can also include a roaming security credential, roaming unique identifier or roaming digital certificate, that can be downloaded and temporarily stored on any computer being used by a user in order to verify its identity and facilitate subsequent interaction with trading counterparts in an online marketplace. Alternatively, the Credential Issuing Authority can generate a password or other unique identifier for a verified user in order to facilitate subsequent interaction with trading counterparts. In accordance with the instant invention, the JV Authority, Registration Authority and Credential Issuing Authority can all comprise a single entity.

Once the identity of a buyer, seller or marketplace is verified and its security credentials established and evinced by, for example, assignment of a digital certificate, the security credentials can be exchanged among users so that trading counterparts can have proof of one another's identities. The security credential or digital certificate exchanged among users can be processed by the Joint Venture Authority and/or Credential Issuing Authority databases in order to perform identity verification. The JV Authority can also perform authorization assessments to determine whether a buyer, seller or marketplace is financially able, or authorized, to complete a transaction. Such authorization assessments can be based on a variety of financial information and/or data including, creditworthiness, profitability and liability limits and on transaction-related information such as the nature, type, monetary amount and size of the transaction. Alternatively, the authorization assessment of a trading counterpart can be provided to a user without revealing the identity of its trading counterpart.

The instant invention also provides a financial product and method for using insurance to provide assurance, e.g., financial assurance, of the identity of a trading counterpart or customer and the ability of such counterpart or customer to complete a transaction. More specifically, the present invention relates to a financial product, such as an identity insurance policy, and a method for determining the premium of the financial product.

The inventive system and method ensures a safe, widely accessible and profitable online, trading marketplace through the functions of identity verification, identity insurance product offerings, and financial authorization, or viability, assessment. The invention described herein provides all of these functions in a single integrated package while being implemented through the Internet and preferably in real time.

SUMMARY OF THE INVENTION

The instant invention is directed to a financial product and insurance method for assuring the identity and financial viability of a trading counterpart or user, wherein an insurance company provides coverage to a user of an online marketplace guaranteeing the identity and financial viability of a trading counterpart. The present invention is further directed to an interactive and dynamic system and method that can verify the identity and financial viability of a trading counterpart or user in an online, trading marketplace. Information regarding a trading counterpart's or user's identity is submitted, the accuracy of this information is assessed and verified, and security credentials are established by, for example, issuing a digital certificate. The security credential or digital certificate can be utilized to verify a user's identity upon subsequent access to an online trading marketplace.

In one embodiment of the financial product, an insurance policy provides assurance to a user, such as financial assurance, of the identity and financial viability of a trading counterpart in online, trading marketplace. The policy provides, in exchange for payment of a premium, for an insurer to cover the risk that the identity or financial ability of a trading counterpart to enter into a transaction was misstated or misrepresented.

In another embodiment, an insurance policy, issued by the issuer, such as an insurance company, for guaranteeing the identity and financial ability of a trading counterpart to enter into a transaction, includes a monetary premium that is determined based on a number of factors. These factors can include, without limitation, the size, monetary amount, and type of transaction, the nature of the goods or services involved in the transaction, the creditworthiness of a trading counterpart or customer, the amount and type of past trading activity by the trading counterpart, and/or the credit score of the trading counterpart.

In a further embodiment of the invention, a method for generating and executing a financial product comprises the steps previously described and additionally, determining whether an identity insurance policy can be provided to the user, and offering said identity insurance policy to the user.

In a further embodiment of the invention, the identity of a buyer, seller or third party, such as, an online trading marketplace, can be verified by a JV Authority. The JV Authority can be a business information provider or a joint venture between a business information provider and an insurance underwriter. Preferably, the JV Authority processes information provided by a user in conjunction with the database(s) of the JV Authority in order to perform identity verification.

In an additional embodiment, the JV Authority can confirm whether a buyer, seller or third party is financially authorized, or able, to enter a transaction. This determination can be based on assessing factors, such as, the size, monetary amount, and type of transaction, the nature of the goods or services involved in the transaction, the credit score of a trading counterpart or user, and/or the amount and type of past trading activity by a trading counterpart or user.

In a still further embodiment, the JV Authority transfers information regarding a buyer, seller or third party whose identity and/or ability to enter a transaction has been verified to a Registration Authority who requests security credentials from a Credential Issuing Authority. Preferably, the Credential Issuing Authority generates a unique identifier, such as, a digital certificate that establishes a user's security credentials when conducting business in an online, trading marketplace.

In another embodiment of the invention, a method is disclosed for verifying a user's identity comprising assigning a personalized password or other unique identifier to each user, which identifier should be entered each time the user accesses the online, trading marketplace.

As an aspect of the present invention, some or all of the steps in the inventive method may be performed by a computerized system.

As an advantage of the invention, the system and method helps electronic marketplaces build liquidity, increase trading volume, reduce expenses, reduce risk and increase trust between trading partners.

As a further advantage, the system and method allows insurance carriers and agents to increase profits by accessing new markets and distribution channels.

BRIEF DESCRIPTION OF THE DRAWINGS

The following detailed description, given by way of example and not intended to limit the present invention solely thereto, will best be understood in conjunction with the accompanying drawings, in which.

DESCRIPTION OF THE PREFERRED EMBODIMENTS

Figure 1:
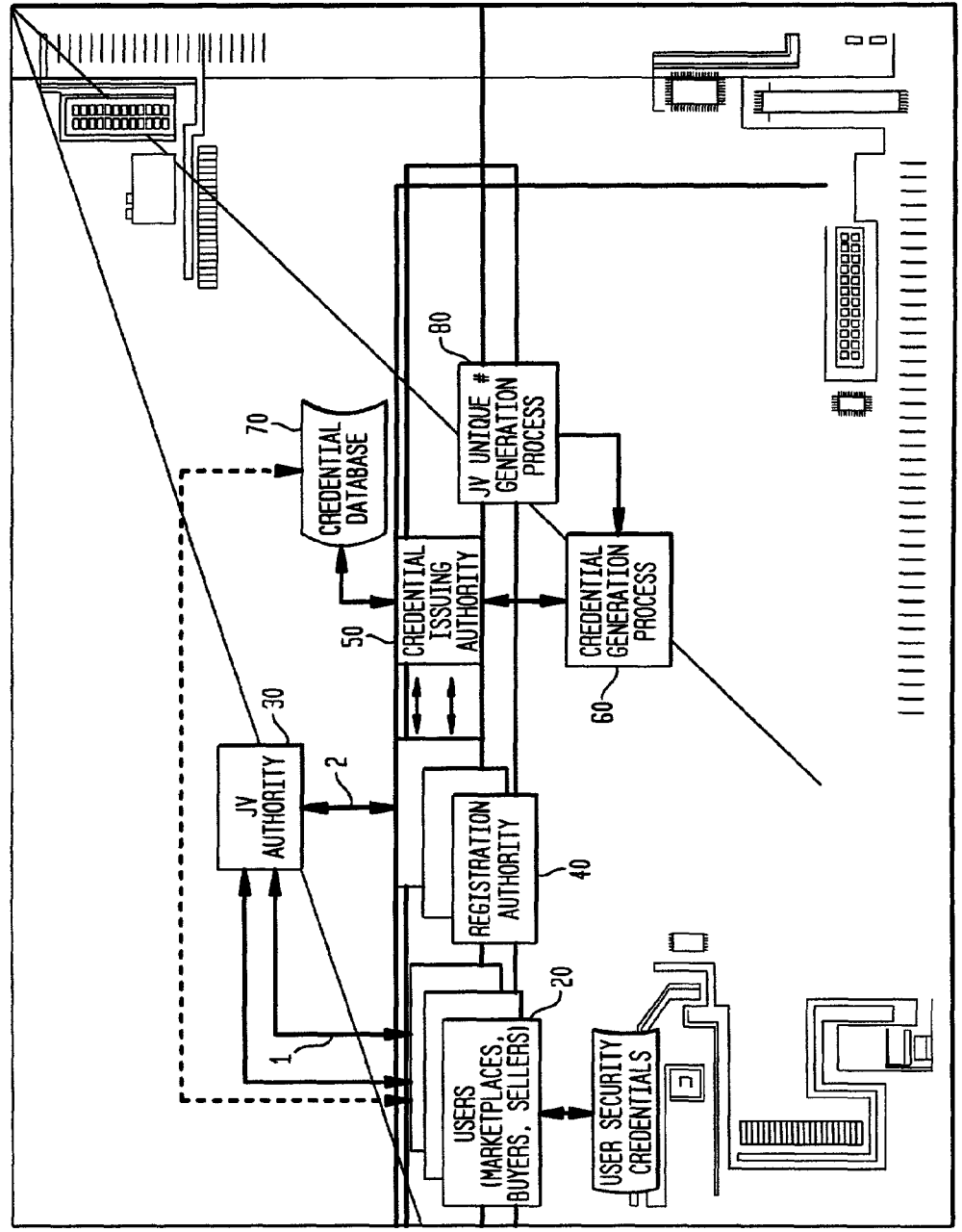
FIG. 1 illustrates a preferred embodiment method for utilizing the system of the present invention, in flow diagram form.

The present invention pertains to a system and method for generating an identity insurance product. Preferably, the identity insurance product of the instant invention comprises identity insurance assuring the identity of a trading counterpart and financial viability insurance assuring the financial ability of a trading counterpart to enter into a transaction. The identity insurance product of the present invention can be, for example, an identity insurance quote, binder, or policy. The instant invention also pertains a method and system for verifying the identities of users and trading counterparts in an online marketplace. The instant invention further pertains to a method and system for verifying the financial ability of a trading counterpart or user to enter into a transaction in an online marketplace. The present invention can be utilized by any user of an online marketplace, such as, buyers, sellers and third parties.

The present invention reduces the risks and obstacles often associated with conducting business in an online marketplace. By reducing the risks and obstacles associated with online, marketplace transactions, the system and method of the instant invention can increase the revenue and profits for buyers, sellers and third parties. The system and method of the instant invention requires only a minimal level of skill to utilize.

The system and method of the instant invention allows buyers, sellers and third parties to utilize marketplaces that were previously too risky or liquid to enter. The system and method of the present invention allows buyers, sellers and third parties to effectively utilize online marketplaces in order to maximize revenue and profits.

The present invention reduces the risks associated with conducting transactions in an online marketplace and also increases the trust among trading partners in such a marketplace. This reduced risk and increased trust will attract more users to marketplaces, thus increasing the volume and liquidity of online marketplaces.

As used herein, the term "user" or the plural of same, refers to any user, users, individual, individuals, business entity, and/or business entities, or buyers, sellers, marketplaces and any third parties involved in the production, delivery or exchange of goods and/or services who or which utilize the present invention.

As used herein, the term "trading counterpart" or the plural of same refer to any individual, individuals, business entity, and/or business entities, buyers, sellers or third parties to an online marketplace transaction who or which utilize the present invention to conduct transactions in an online marketplace with users of such a marketplace. For example, a user who is a buyer will have a seller as a trading counterpart.

As used herein, the term "identity insurance" refers to insurance used to cover losses associated with the misidentification or misrepresentation of a user's or trading counterpart's identity in an online marketplace transaction, and/or to financial viability insurance used to cover losses associated with the financial inability of a user or trading counterpart to enter into or complete an online marketplace transaction. Preferably, as used herein, the term "identity insurance" comprises identity insurance and financial viability insurance.

As used herein, the term "online marketplace" refers to a website available on the Internet or World Wide Web that acts as an intermediary between parties desiring goods and/or services and potential providers of such goods and/or services. An online marketplace can be, for example, a business-to-business marketplace website or brokering website.

As used herein, the term "identity insurance product", or the plural of same, refers to an identity insurance quote, binder and/or policy.

As used herein, the term "credit score" refers to a number or other score typically used to represents the credit risk of a particular entity or individual. Typically, the higher the score, the lower the credit risk. The calculation of a credit score involves evaluating many types of credit and financial information regarding an entity or individual, including, without limitation, credit history, types of credit currently used, payment history, indebtedness, profitability and nature of business conducted.

As used herein, the terms "unique identifier," or "security credential," or the plural of same, refer to a user name, password, digital certificate or alphanumeric identifier that establish the security credentials of a user or trading counterpart and/or uniquely identifies the user or trading counterpart in an online marketplace.

As used herein, the terms "roaming unique identifier," or "roaming security credential," or the plural of same, refer to a unique identifier or security credential that can be transferred to, and temporarily stored in the cache memory of, whatever computer the user is using at the time.

As used herein, the term "digital certificate", or the plural of same, refers to information that establishes the security credentials of users of an online marketplace. A digital certificate can be issued by a certification or credential issuing authority and contain information, such as, user name, a number identifying the user, expiration date for the digital certificate, and the digital signature of the certification or credential issuing authority.

As used herein, the term "single use digital certificate," or the plural of same, refers to a digital certificate that can only be used one time.

As used herein, the term "time-based digital certificate," or the plural of same, refers to a digital certificate that can be used only for a specified amount of time.

As used herein, the term "marketplace-only digital certificate," or the plural of same, refers to a digital certificate that can only be used for a specified online marketplace.

As used herein, the term "administrator" and "operator", or the plurals of same, refer to any administrator, administrators, operator, and/or operators, who or which operate or administer the operation of the system and method of the present invention.

As used herein, the terms "joint venture authority" or "joint venture" refer to an individual, individuals, a business entity and/or business entities that acts as a business information provider and/or is a joint venture or other business combination comprising an insurance underwriter and business information provider, wherein the business information provider provides business information regarding an online marketplace user or trading counterpart and the insurance underwriter provides identity insurance in connection with business conducted by a user in an online marketplace. Preferably, as used herein, a joint venture authority or joint venture is a business information provider.

As used herein, the term "business information provider," or the plural of same, refers to any individual, individuals, business entity and/or business entities who or which provide information relating to a user's finances, credit risk, insurance coverage and business operations, including, without limitation, contact information, credit rating, nature of goods and services provided, quality assurance issues, environmental or hazardous risk issues, and indebtedness. A business information provider can comprise a joint venture or other business combination between a business information provider and an insurance underwriter. A business information provider can be, for example, Dun & Bradstreet, Bureau Veritas, Intertek Testing Services, and/or SGSonSITE.

As used herein, the term "credential issuing authority," or "certification authority" refers to any individual, individuals, business entity and/or business entities that process requests for, issues and/or manages security credentials or unique identifiers.

The joint venture authority, registration authority, and credential issuing authority of the inventive method and system can all comprise a single entity.

The system of the instant invention includes a central processing computer. The central processing computer can be any computer, computer system, network computer, server computer, and/or web site hosting computer, suitable for performing any of the functions and processing routines described herein. The central processing computer can be used by and/or can be associated with any of the operators or administrators who or which provide the information, services, or products described herein.

The central processing computer of the instant invention can also include any number of computers, computer systems, network computers, and/or server computers. Any number of central processing computers can be utilized in conjunction with the system and method of the instant invention.

The system also includes a user computer or communication device. The user communication device can be utilized by, and/or can be associated with any of the herein-described users or individuals who or which utilize the system.

The user communication device can be any computer or communication device for facilitating a user's or an individual's accessing of the central processing computer of the instant invention and obtaining of any identity verification, financial viability verification, and/or identity insurance products, such as, quotes, binders, policies, and/or information related thereto, which are described herein as being provided by the system and/or the central processing computer of the instant invention. The user communication device(s) of the present invention can communicate with any/or can be linked to the central processing computer of the present invention on or over any suitable communication network or system. The system of the present invention can include any number of user communication devices.

The system of the present can also include a third party computer which can be utilized by, or associated with any of the herein-described identity insurance underwriters, business information providers, Registration Authority, or Credential Issuing Authority in order to receive or provide information to the central processing computer of the instant invention.

In the preferred embodiment, the system of the instant invention can be utilized on, or over, the Internet and/or the World Wide Web. The system can also be utilized on, or over, any communication network or system, or any telecommunication network or system. The system of the present invention can also be utilized on, or over, any communication network or platform. The system and method of the instant invention, in the preferred embodiment, can also provide information in real time or otherwise.

The central processing computer of the present invention may include a central processing unit (CPU), a random access memory (RAM) device, a read only memory (ROM) device, a user input device, such as a keyboard, a mouse, and/or a pointing device, a display device, a transmitter and a receiver for facilitating network communication with any of the user communication devices of the instant invention and/or with any third party computers, and a database for storing any of the data and/or information needed and/or desired for performing the functions and/or processing routines described herein.

The database of the instant invention can contain user identity and financial information, trading counterpart identity and financial information, identity insurance risk and risk assessment information, data and/or information regarding identity insurance quotes, binders and policies, identity insurance underwriting information, and identity insurance information including, without limitation, reference and marketing materials.

The database of the present invention can also contain information for providing a link or links to any of the above-described information which may be stored at, or which may reside on, any third-party computers. The database can also include programs for performing any of the processing routines described herein as being performed by the system or by the central processing computer.

The database of the instant invention can also contain information for generating identity insurance quotes, binders and policies, information for executing identity insurance binders and policies, and information for underwriting identity insurance policies.

The database of the present invention can also contain insurance risk assessment and risk management data and/or information, underwriting programs, insurance policy information, insurance policy form information, insurance policy premium information, and/or insurance policy premium discount information.

The database of the instant invention can also contain data and/or information regarding links to any of the herein-described information that may reside and/or be stored at external databases or information sources. The database can also contain links or linking information to any computers, server computers, or web sites, which can be associated with any information sources, including, without limitation, third party computers, from which any of the herein-described data and/or information can be obtained.

Preferably, the database of the present invention contains data and/or information for assessing the identity insurance risk associated with a user's trading counterpart. Such information can include, for example, the trading counterpart's credit score, the amount and type of the trading counterpart's previous trading history, the monetary amount and type of transaction for which identity insurance is desired and the nature of the goods and/or services involved in the transaction for which identity insurance is desired.

The database of the instant invention can also contain any data and information needed or desired for enabling the central processing computer of the present invention, and the system of the instant invention, to perform any of the processing routines or functionality described herein.

The system and method of the present invention can be utilized to verify the identities of all parties to an online marketplace transaction.

FIG. 1 is a flow diagram that illustrates a preferred embodiment of a method for utilizing the system of the instant invention. The user can access the central processing computer and database of the inventive system via a communications device. Referring to FIG. 1, a user 20 who has not been verified and who does not already have a unique identifier, digital certificate or password initiates registration and verification (line 1) with the business information provider or joint venture authority (hereinafter "JV Authority") 30 connected to the system of the instant invention, preferably through a website on the Internet or World Wide Web, and inputs identifying information requested in order to identify the user. Registration can occur by a manual process of registering one user at a time, such as, a point and click web page or file transfer, or more than user at a time can be registered by an automated batch process, such as, directory replication or extensible markup language ("XML") transfer. The JV Authority 30 processes said information in conjunction with information contained in the database of business information providers and/or insurance underwriters included in said JV Authority in order to verify a user's identity. Preferably, the database of said joint venture authority contains financial, insurance and business information relating to business entities and individuals provided by an insurance underwriter and business information provider, such as, Dun & Bradstreet.

If the JV Authority 30 determines that a user, or authorized representative of the user, is in fact who they represent themselves to be, the user's identity is verified, Referring to line 2 and element 40 of FIG. 1, the method of the instant invention then transfers information about said verified user to a registration authority 40. Registration authority 40 requests security credentials or a unique identifier, preferably a digital certificate, from the credential issuing authority 50. The digital certificate can be single use, time-based or marketplace only in nature. Credential issuing authority 50 generates security credentials or a unique identifier as shown in element 60, saves said credentials or unique identifier in accompaniment with information regarding said verified user in credential database 70, and issues security credentials to the user via the registration authority 40 and joint venture authority 30. Alternatively, a unique number, alphanumeric identifier or other identifying information can be generated for a verified user as shown in element 80.

Referring to FIG. 1, a user who has already been verified and issued security credentials or a unique identifier can access the instant invention by providing such credentials 10 or identifier to the joint venture authority database 30. As shown by the dotted line, this information can be processed in conjunction with information saved in the credential database 70 in order to verify that the user's credentials or identifier are valid.

Figure 2:
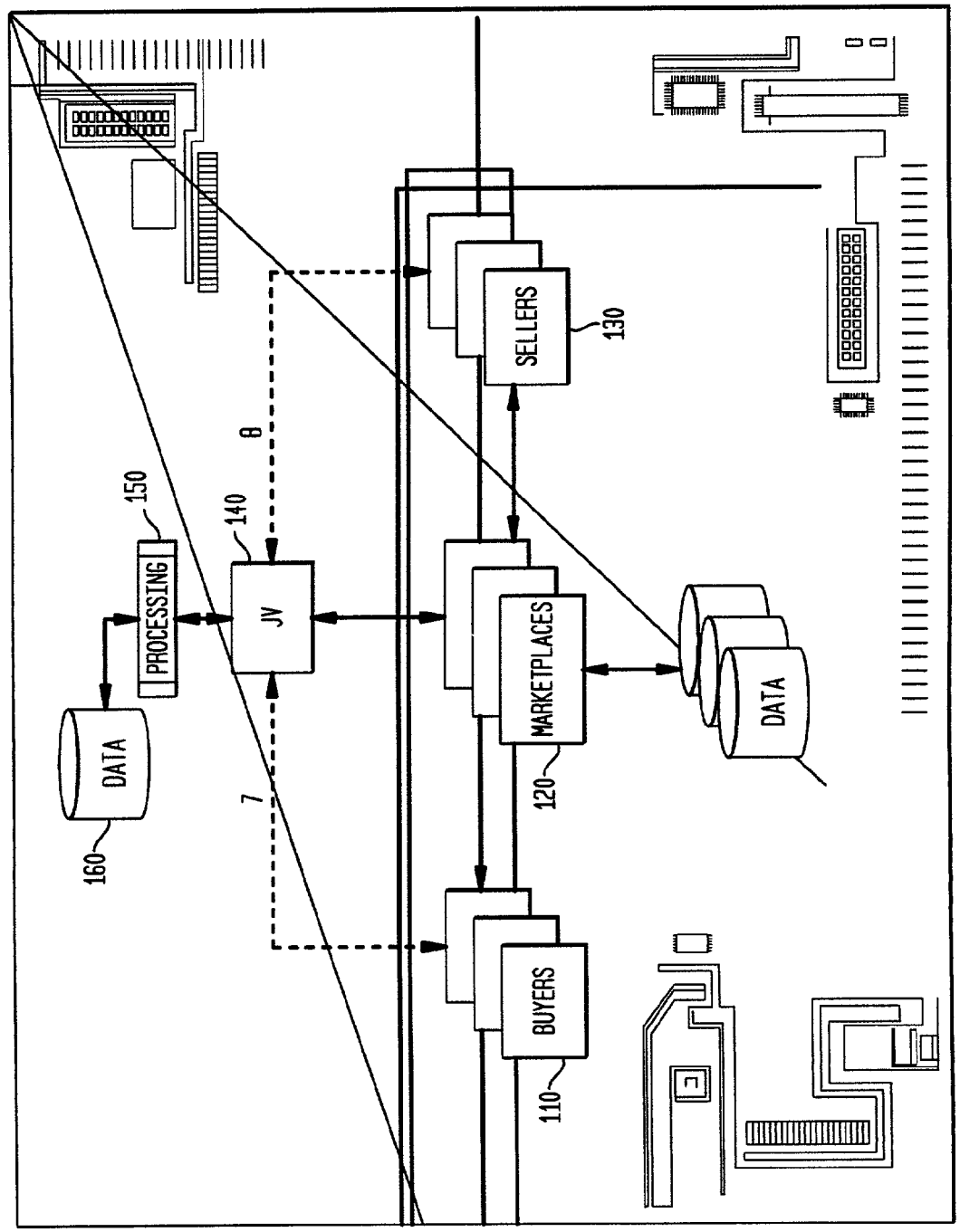
FIG. 2 illustrates a preferred embodiment method for utilizing the system of the instant invention to verify user identity, in flow diagram form.

Referring to FIG. 2, dotted lines 7 and 8, buyers 110 and sellers 130 can directly interact with the joint venture authority ("JV") 140 to verify the marketplace's 120 identity and to securely download a roaming security credential for the purpose of identity verification during a transaction. The JV verifies the identity of marketplace 120 by processing, as shown in element 150, information regarding marketplace 120 in conjunction with information contained in its database 160. The JV can also provide roaming security credentials to buyers 110 and sellers 130 by processing information regarding buyers 110 and sellers 130 in conjunction with its database 160. The roaming security credential provides timed access to the security credential for passing contracts. The roaming security credential enables a user to enter into a transaction using any computer.

Figure 3:
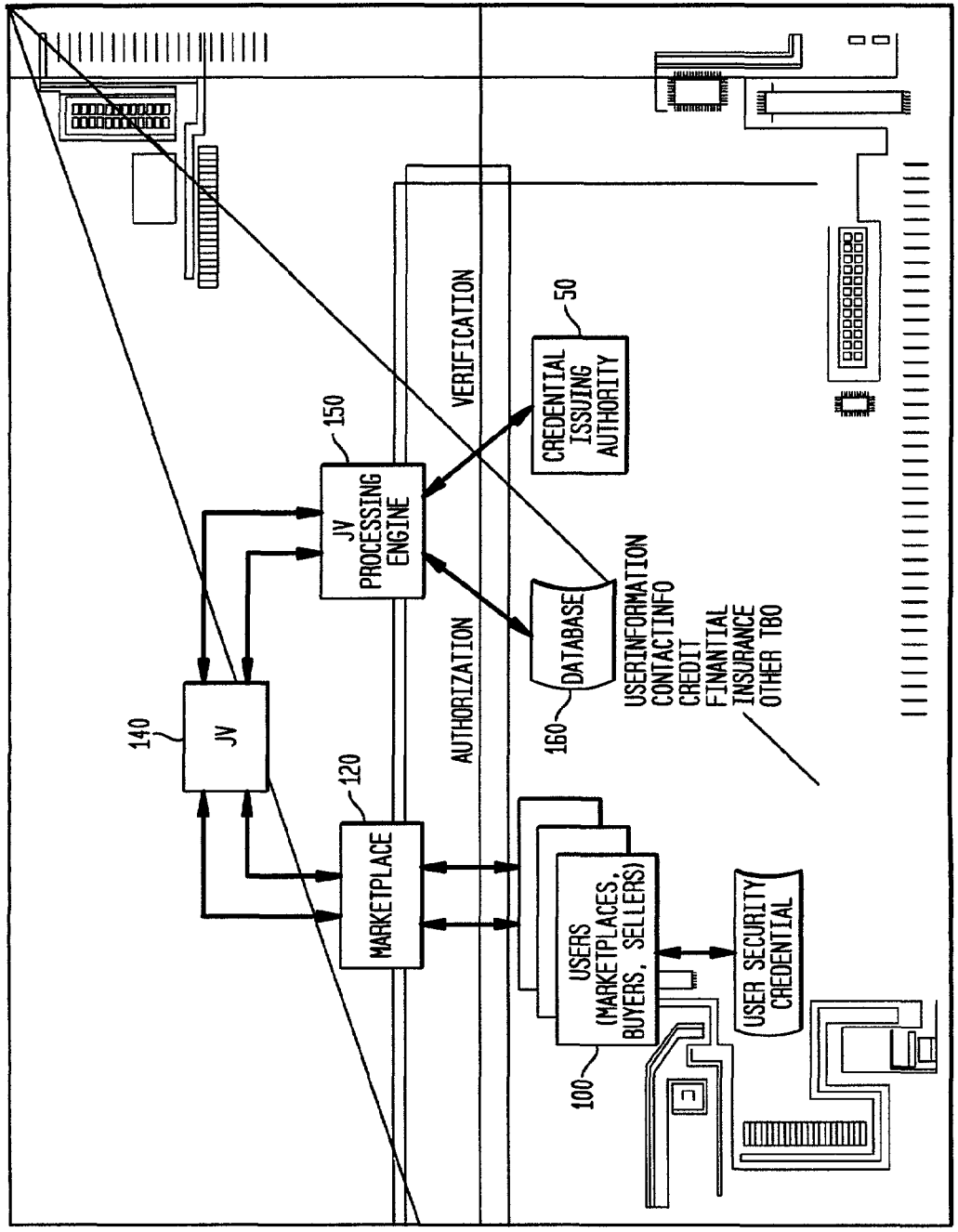
FIG. 3 illustrates a preferred embodiment method for utilizing the system of the instant invention to verify user identity and to assess the financial authorization, or financial ability, of a user to enter into a transaction, in flow diagram form.

FIG. 3 illustrates a preferred embodiment of the instant invention in flow diagram form. Referring to FIG. 3, previously verified users 100 provide information regarding their security credentials or unique identifiers as obtained in accordance with the method of FIG. 1 to the joint venture authority ("JV") 140. This information is processed in the joint venture processing engine 150 in conjunction with information stored in the credential issuing authority 50 in order verify the user's identities to their trading counterparts. Preferably, the marketplace 120 utilizes the JV 140 to assess the buyer's and seller's security credentials and ensure that they have not been revoked. The marketplace 120 can also provide its security credentials to the JV 140 to verify the marketplace's identity, and the JV 140 can provide its security credentials to the marketplace 120 to verify the JV's identity.

Figure 4:
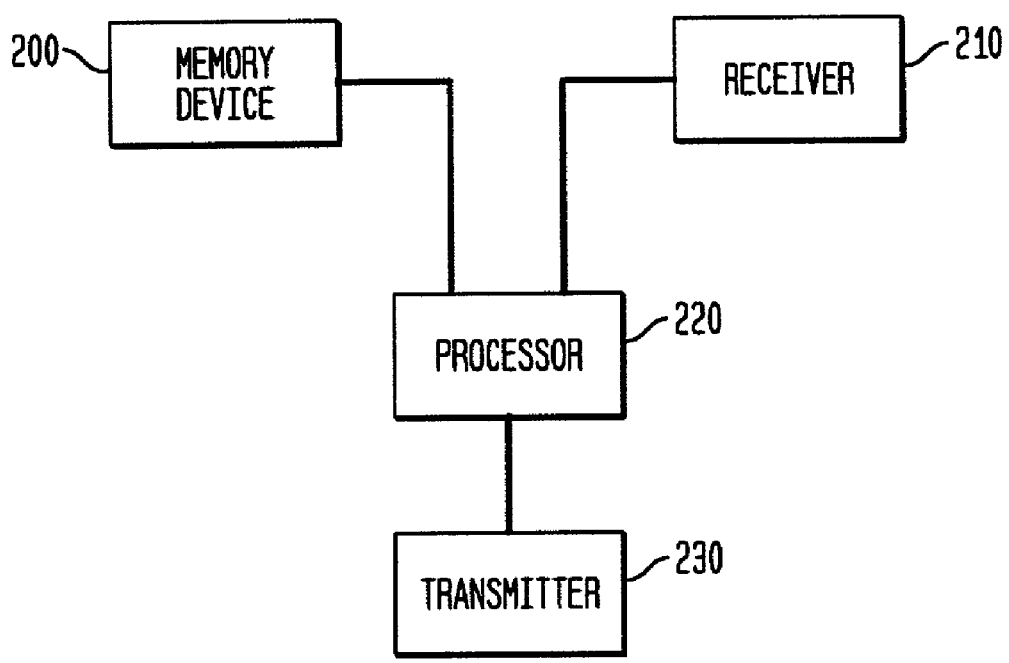
FIG. 4 illustrates a computer system used to generate an identity insurance product in accordance with the method of the present invention.

If requested by a user, the inventive method and system can provide authorization services and determine whether a user's trading counterpart is financially authorized, or financially viable enough, to enter into an online marketplace transaction. As illustrated in element 160 of FIG. 3, the JV processing engine 150 can perform such authorization services by processing information regarding a trading counterpart, such as, its security credentials, and information regarding the transaction, such as, the monetary size and type of transaction and nature of goods and/or involved in the transaction, in conjunction with information stored in database 160. Preferably, database 160 contains stored information regarding previously verified trading counterparts and users, such as, credit scores, activity indicator, amount and type of previous trading activity, nature and type of business, contact information, insurance coverage information, and other financial information. The JV can then display to a user whether its trading counterpart is financially authorized or able to enter into a transaction. Such information can be provided to a user without revealing the identity of the trading counterpart FIG. 4 illustrates a computer system used to generate an identity insurance product for a user according to the inventive method, in accordance with the present invention. Preferably the system of the present invention comprises a memory device 200, a receiver 210, a processor 220 and a transmitter 230. In a preferred embodiment of the inventive system, memory device 200 stores information including, without limitation, the amount and type of a trading counterpart's previous trading activity, financial and insurance information regarding a trading counterpart, and the credit score of a trading counterpart, receiver 210 receives transaction information from a user, wherein said transaction information comprises, without limitation, the monetary size and type of transaction and the nature of the goods and/or services involved in the transaction, processor 220 processes said transaction information in conjunction with said information stored in memory device 200 to determine whether an identity insurance product can be generated regarding said trading counterpart, and, if an identity insurance product can be generated, an identity insurance product is generated and transmitted, by transmitter 230, to a communication device associated with the user.

In a preferred embodiment, an identity insurance quote is generated which contains an offer to accept said quote. If said generated quote is accepted by the user, a binder can be generated. Upon the generation of a binder, an insurance policy can be generated for the user.

The system and method of the present invention can also generate any documents, reports, insurance policies, notification messages, or any other information incidental thereto, for facilitating the operation of the present invention as described herein.

The system and method of the present invention can also be utilized in a multinational or international environment and, hence, can provide any of the herein-described documents, reports, insurance policies, notification messages, or other information, in multiple languages. Any related and/or associated monetary information can also be provided in multiple currencies.

While the present invention has been described and illustrated in various preferred embodiments, such descriptions are merely illustrative of the present invention and are not to be construed to be limitations thereof. In this regard, the present invention encompasses any and all modifications, variations, and/or alternate embodiments, with the scope of the present invention being limited only by the claims that follow.

What is claimed is:

1. A method for providing insurance coverage guaranteeing to a user the identity of a trading counterpart in an online marketplace transaction as being a specified person, persons, or entity, the method comprising the steps of:
calculating, using a central processing computer, a monetary premium for an identity insurance policy, the premium calculated based upon risk assessment information accessed through the central processing computer relating to a risk of loss caused by the identity of the trading counterpart in the online marketplace transaction being different than the specified person, persons, or entity;
supplying, by an insurer, the identity insurance policy to the user, wherein the identity insurance policy provides coverage for the user against a loss resulting from the identity of the trading counterpart in the online marketplace transaction being different than the specified person, persons, or entity;
receiving, by the insurer, the premium from the user;
supplying, by the insurer, additional insurance to the user, wherein the additional insurance provides coverage for the user against a loss resulting from the financial inability of the trading counterpart to complete an online marketplace transaction, the additional insurance including an additional predetermined monetary premium payable to the insurer; and
receiving the additional premium by the insurer from the user.

2. The method of claim 1, wherein calculating the premium includes assessing at least one of an amount and type of the trading counterpart's previous transactions, a monetary amount and type of the transaction, the nature of goods involved in the transaction, the nature of services involved in the transaction, or any combination thereof.

3. The method of claim 1, wherein calculating the premium includes assessing information comprising an amount and type of the trading counterpart's previous transactions, a monetary amount and type of the transaction, the nature of goods involved in the transaction, and the nature of services involved in the transaction.

4. The method of claim 1, wherein said additional premium is calculated by assessing at least one of a credit score of said trading counterpart, an amount and type of said trading counterpart's previous said transactions, a monetary amount and type of said transaction, the nature of goods involved in said transaction, the nature of services involved in said transaction, or any combination thereof.

5. The method of claim 1, wherein said additional premium is calculated by assessing information comprising a credit score of said trading counterpart, an amount and type of said trading counterpart's previous said transactions, a monetary amount and type of said transaction, the nature of goods involved in said transaction, and the nature of services involved in said transaction.

6. The method of claim 1, wherein said additional premium is calculated by assessing a credit score of said trading counterpart, wherein said credit score is calculated by analyzing at least one of the nature of said trading counterpart's business, profitability of said trading counterpart, indebtedness of said trading counterpart, payment history of said trading counterpart in previous said transactions, or any combination thereof.

7. The method of claim 1, further comprising: determining whether the trading counterpart is financially authorized to enter the transaction prior to supplying the identity insurance policy to the user.

8. The method of claim 1, further comprising:
determining whether the trading counterpart is a verified user of the online marketplace.

9. The method of claim 8, wherein the premium is based in part on whether the trading counterpart is a verified user.

10. The method of claim 1, further comprising:
providing a security credential or unique identifier to the trading counterpart upon a determination that the trading counterpart is a verified user.

11. The method of claim 1, wherein the trading counterpart is the online marketplace.

12. A method for providing insurance to a user for losses caused by the misidentification or misrepresentation of the identity of a trading counterpart in an online marketplace transaction or by the financial inability of the trading counterpart to enter and complete the transaction, the method comprising the steps of:
calculating, using a central processing computer, a monetary premium for an insurance policy, the premium based upon risk assessment information accessed through the central processing computer relating to a risk of loss associated with the identity of the trading counterpart in the online marketplace transaction being different than a specified person, persons, or entity and to a risk of loss associated with the financial inability of the trading counterpart in the online marketplace transaction to complete the online marketplace transaction;
supplying, by an insurer, the insurance policy to the user, wherein the insurance policy provides coverage for the user against a loss resulting from the identity of the trading counterpart being different than the specified person, persons, or entity and against a loss resulting from the financial inability of the trading counterpart to complete the transaction; and
receiving, by the insurer, the premium from the user.

13. The method of claim 12, wherein said premium is calculated by assessing at least one of a credit score of said trading counterpart, an amount and type of said trading counterpart's previous said transactions, a monetary amount and type of said transaction, the nature of goods involved in said transaction, the nature of services involved in said transaction, or any combination thereof.

14. The method of claim 12, wherein said premium is calculated by assessing information comprising a credit score of said trading counterpart, an amount and type of said trading counterpart's previous said transactions, a monetary amount and type of said transaction, the nature of goods involved in said transaction, and the nature of services involved in said transaction.

15. The method of claim 12, wherein said premium is calculated by assessing a credit score of said trading counterpart, wherein said credit score is calculated by analyzing at least one of the nature of said trading counterpart's business, profitability of said trading counterpart, indebtedness of said trading counterpart, payment history of said trading counterpart in previous said transactions, or any combination thereof.

* * * * *